(No Model.) 6 Sheets—Sheet 1.
W. C. PORTER.
ELECTRIC CALCULATOR.

No. 546,553. Patented Sept. 17, 1895.

Witnesses
C. H. Hill,
B. E. Squire

Inventor
William C. Porter
By Chas. I. Barnes
Attorney (No Model.) 6 Sheets—Sheet 2.
W. C. PORTER.
ELECTRIC CALCULATOR.
No. 546,553. Patented Sept. 17, 1895.
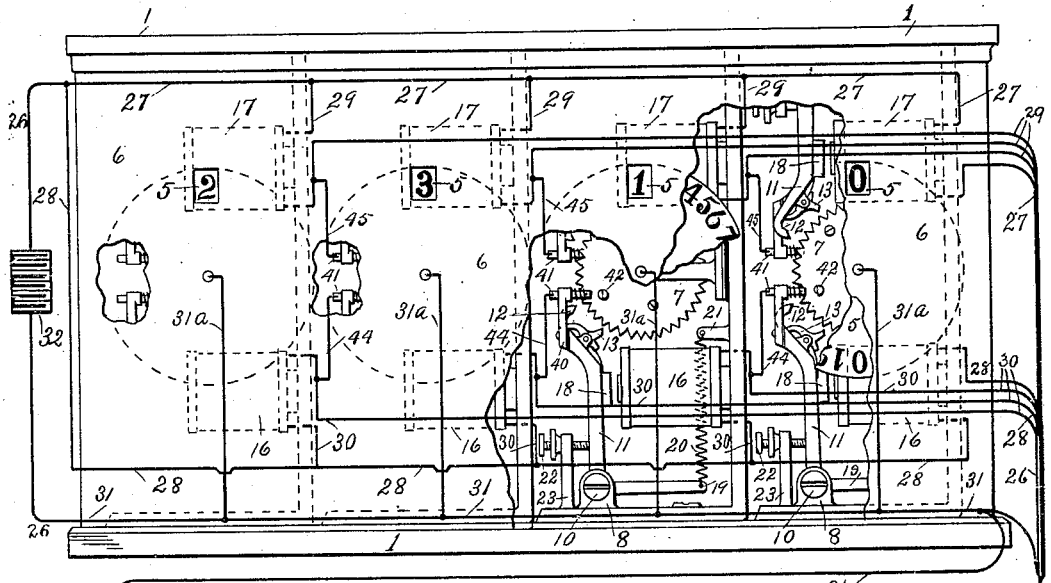
Fig 3.
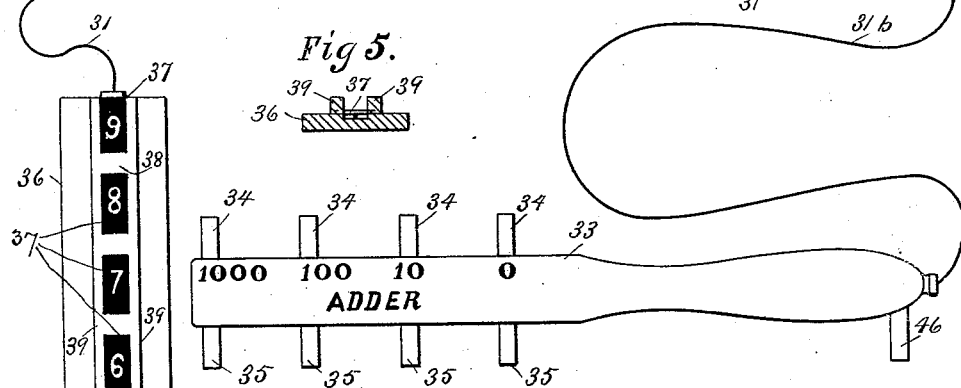
Fig 5.
Fig 4.
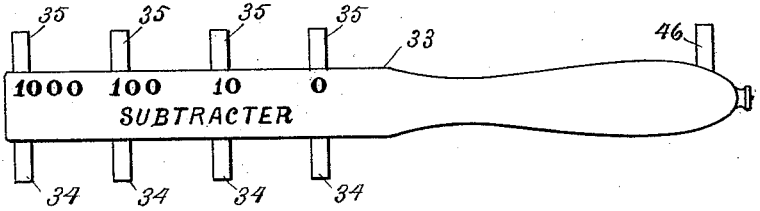
Witnesses
C. H. Hill,
B. E. Squire
Inventor
William C. Porter
By Chas. Cairns
Attorney.

(No Model.) 6 Sheets—Sheet 3.

W. C. PORTER.
ELECTRIC CALCULATOR.

No. 546,553. Patented Sept. 17, 1895.

Witnesses
C. H. Hill
B. E. Squire

Inventor
William C. Porter
By Chas. L. Bairns
Attorney.

(No Model.)  6 Sheets—Sheet 4.

W. C. PORTER.
ELECTRIC CALCULATOR.

No. 546,553. Patented Sept. 17, 1895.

Witnesses
C. H. Hill
F. A. Warner

Inventor
William C. Porter
By Chas. L. Cairns
Attorney (No Model.) 6 Sheets—Sheet 5.
W. C. PORTER.
ELECTRIC CALCULATOR.

No. 546,553. Patented Sept. 17, 1895.

Witnesses
C. H. Hill
B. E. Squire

Inventor
William C. Porter
By Chas. Cairns
Attorney (No Model.) 6 Sheets—Sheet 6.

W. C. PORTER.
ELECTRIC CALCULATOR.

No. 546,553. Patented Sept. 17, 1895.

Witnesses
C. H. Hill
B. E. Squire

Inventor
William C. Porter
By Chas.␣Bairn
Attorney

ANDREW B. GRAHAM, PHOTO-LITHO, WASHINGTON, D.C.

UNITED STATES PATENT OFFICE.

WILLIAM C. PORTER, OF ARLINGTON, MINNESOTA, ASSIGNOR OF ONE-HALF TO AUG. G. OBERNOLTE, OF SAME PLACE.

ELECTRIC CALCULATOR.

SPECIFICATION forming part of Letters Patent No. 546,553, dated September 17, 1895.

Application filed December 1, 1894. Serial No. 530,625. (No model.)

*To all whom it may concern:*

Be it known that I, WILLIAM C. PORTER, a citizen of the United States, residing at Arlington, in the county of Sibley and State of Minnesota, have invented a new and useful Electric Calculator, of which the following is a specification.

My invention relates to calculators in which dials are made to rotate and successively present numerals by the making and breaking of electric currents; and the object of my improvement is to provide a convenient apparatus by which the several operations of adding, subtracting, multiplying, and dividing may be effected. I attain this object by the mechanism illustrated in the accompanying drawings, in which—

Figure 1:
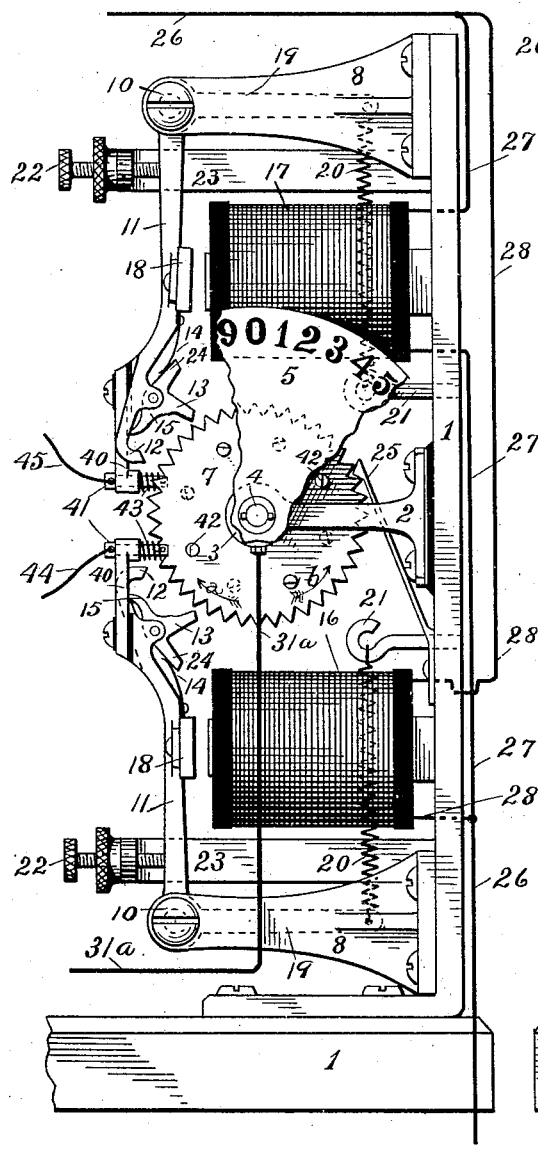
Figure 2:
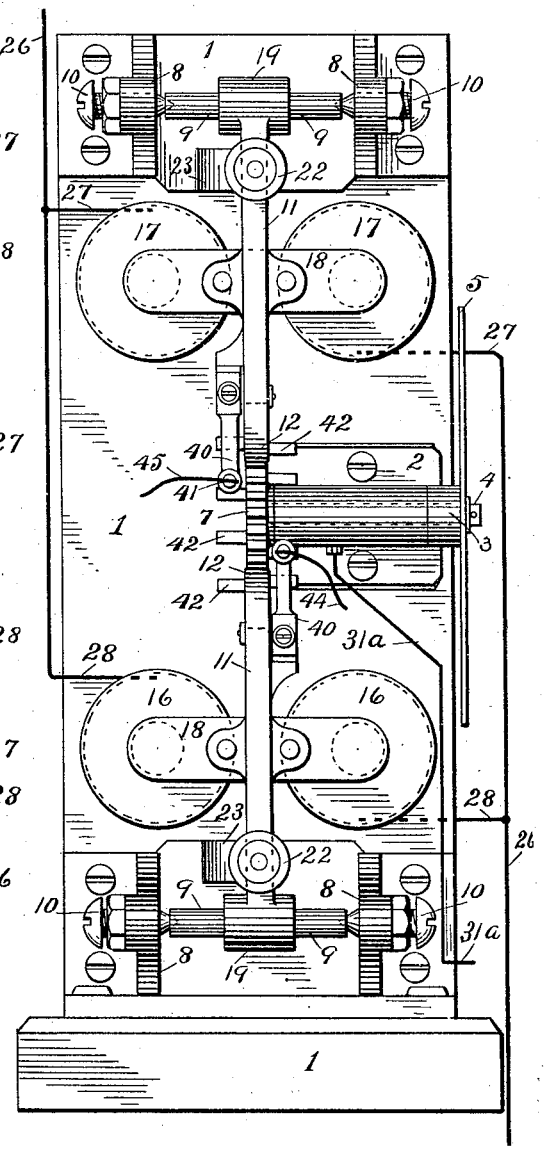
Figure 6:
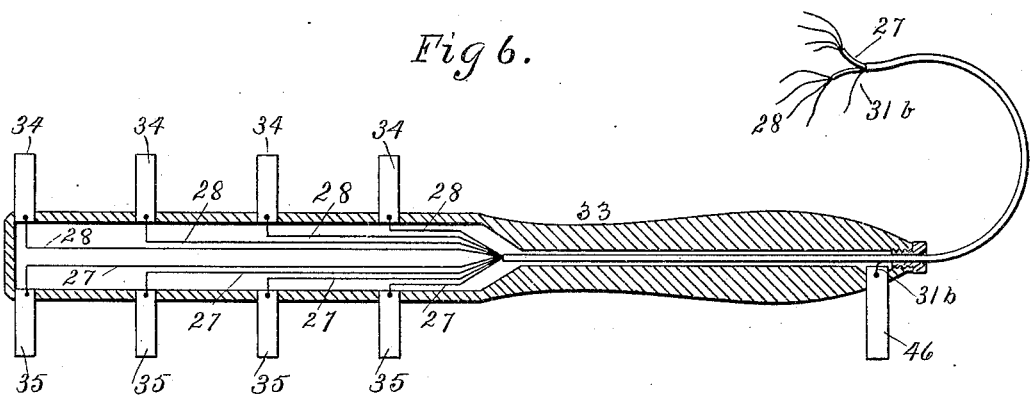
Figure 7:
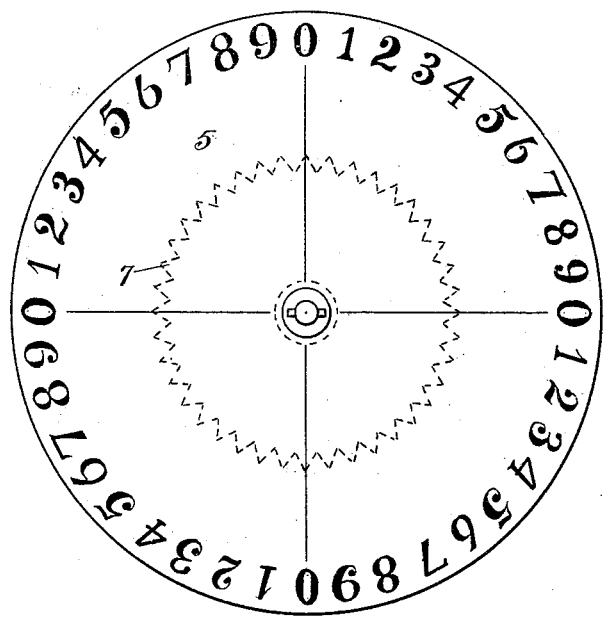
Figure 8:
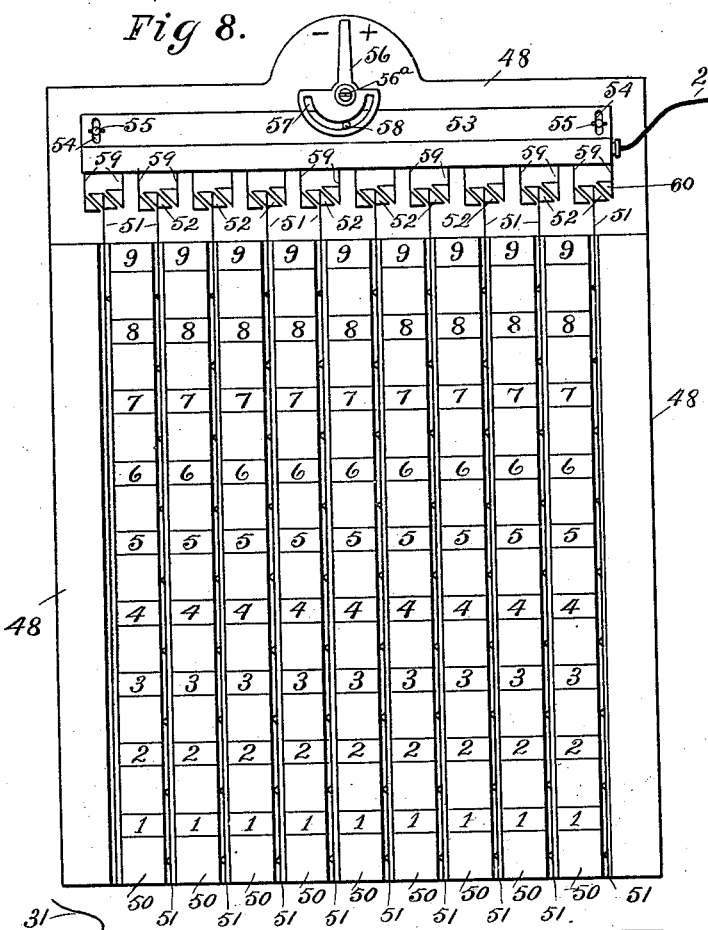
Figure 9:
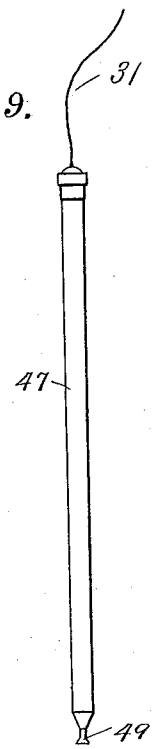
Figure 10:
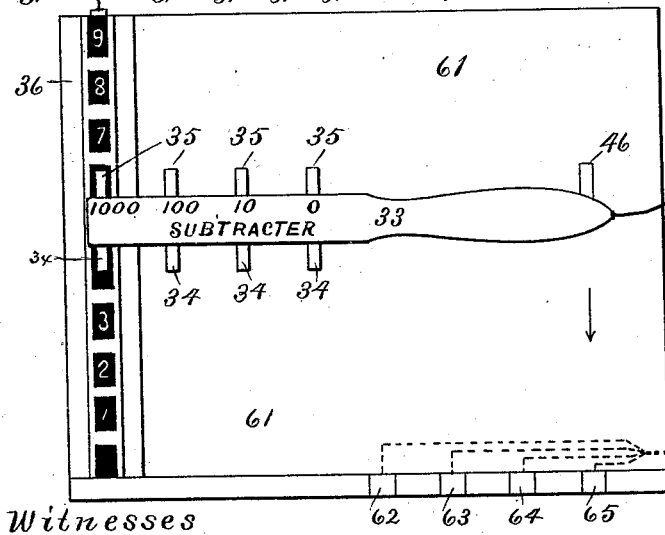
Figure 11:
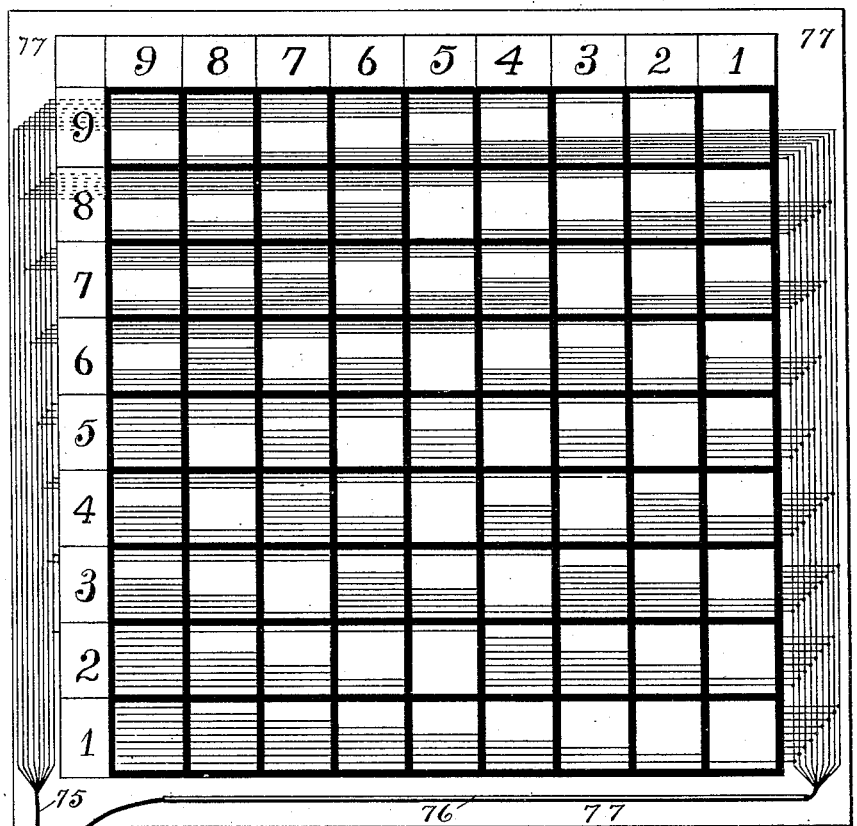
Figures 12, 13:
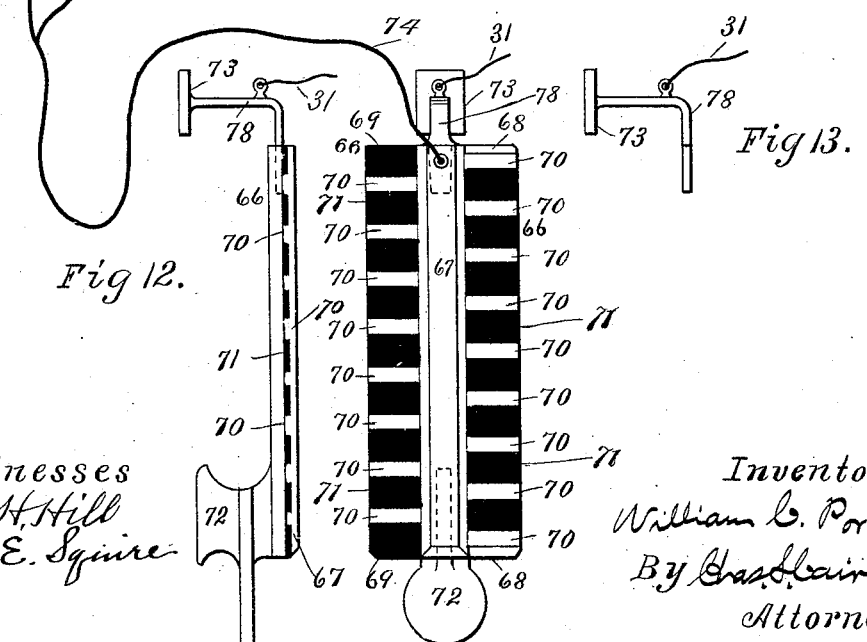
Figure 14:
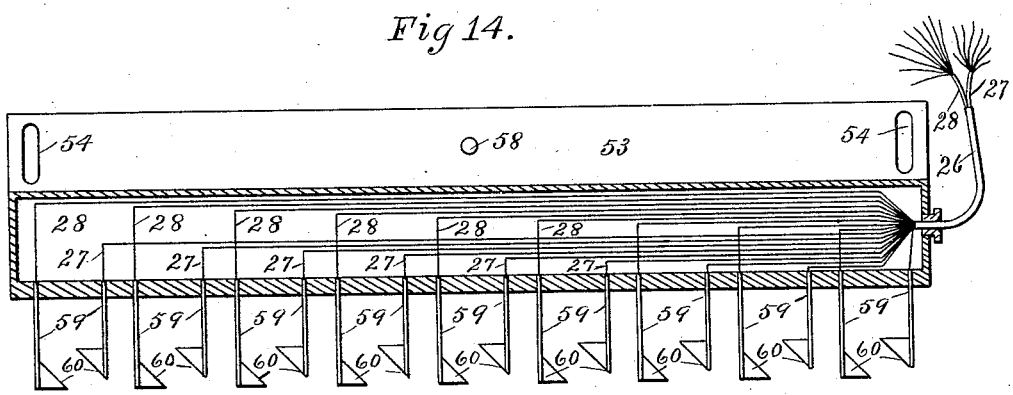
Figure 15:
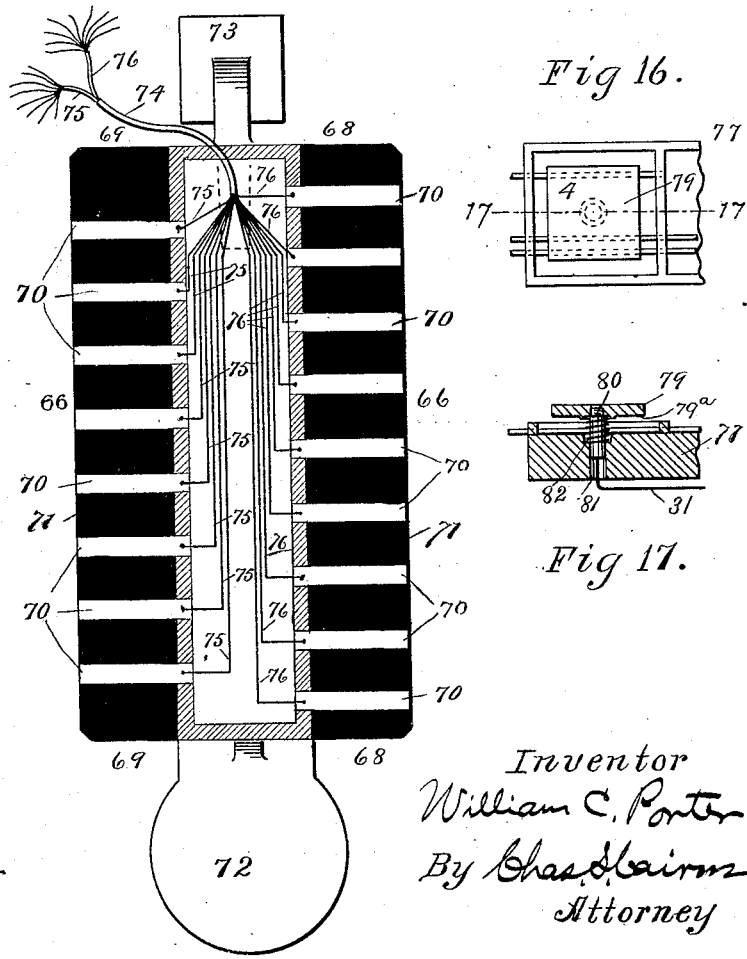
Figure 16:
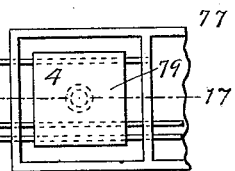
Figure 17:
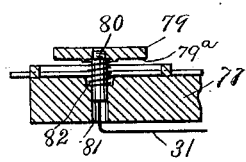

Figure 1 is a front elevation of one of the registering-dials, with its pairs of electric magnets and other mechanism for actuating the dial electrically, the outer casing being removed and most of the dial broken away to show the other parts. Fig. 2 is a side view of the same. Fig. 3 is a front view of a series of such dials with similar operating mechanism, parts being also broken away, and with a circuit maker and breaker tablet, and an adder and subtracter brush connected therewith by wire, making a complete apparatus for addition and subtraction. Fig. 4 is the same brush with the subtracter side presented. Fig. 5 is a cross-section of the tablet shown in Fig. 3. Fig. 6 is a longitudinal section of the adder and subtracter brush on an enlarged scale, showing the manner in which it is wired. Fig. 7 is a front view of one of the registering-dials on an enlarged scale. Fig. 8 is a plan view of a pencil-board for addition and subtraction. Fig. 9 is a pencil to be used in connection with the board shown in Fig. 8. Fig. 10 is a plan view of a divider-board. Fig. 11 is a plan view of the multiplier-board with the multiplier block or tablet wired thereto. Fig. 12 is a side view of the multiplier-tablet shown in Fig. 11. Fig. 13 is a detail showing the foot attached to the multiplier-block. Fig. 14 is a detail on an enlarged scale with outer cover removed, showing the wiring of the switch devices attached to the pencil-board shown in Fig. 8. Fig. 15 is an enlarged view of the multiplier-tablet with the top portion removed to disclose the wiring. Fig. 16 is a plan view of a key for the multiplier-board attached to one of its squares. Fig. 17 is a cross-section of the same through the line 17 17, Fig. 16.

The same numerals refer to the same parts throughout the several views.

In speaking of this machine the parts are referred to as in the position wherein the machine rests on a table or similar support.

In Figs. 1 to 3, 1 is the frame, to which is rigidly secured the foot of a standard 2, having a sleeve 3 at its opposite end, which encircles an axis 4, loosely held therein, so it may turn. On the outer or front end of the axis 4 is tightly fitted a disk or dial 5, so as to rotate with the axis. On the outer face of the disk are arranged series of numbers at equal distances, running from "0" to "9," there being ten in a series, and a number of such series completing the circuit of the wheel. I prefer four such series upon the wheel, as shown in Fig. 7. In the front casing 6 an opening is provided through which the top number on the disk appears, as shown in Fig. 3. On the inner or near end of the axis 4 is rigidly secured a ratchet-wheel 7, having a tooth for each number on the disk 5. Standards 8 are secured to the frame 1 in pairs, two on each side of the ratchet-wheel 7. Between the free ends of each pair of standards is loosely secured an arbor 9 in such manner as to permit its turning with little friction upon points of screws 10, passing through the standards 8 and entering sockets in the ends of the arbor. An arm 11 is rigidly secured to the arbor 9 and extends inward (one from each side) over the ratchet-wheel 7. The inner end of each arm 11 is bent and shaped to form a locking-pawl 12. On the under side of arms 11 is pivoted an operating-pawl 13. A spring 14 is secured to the under side of each arm 11 and rests with its free end upon an arm 24 of pawl 13, so as to press the end of the pawl toward the ratchet-wheel, while an arm 15 of the pawl plays against the under side of the arm 11 to limit the action of the spring 14. On each side, located between the standards 8 and ratchet-wheel 7, is a pair of electromagnet-coils secured to frame 1, those on the "adder" side being designated 16 and those on the "subtracter" side 17. An armature 18 is secured to arms 11 and extends over its pair of magnets 16 and 17, respectively. A lever 19, secured to the arm 11 rigidly at the latter's pivot, extends at right angles thereto, and to the free end of lever 19 is attached one end of a helical spring 20, while the other end of the spring is held by a hook 21, secured to frame 1. The springs 20 serve to move the arms 11 with their connected parts away from the ratchet-wheel 7, and this motion is limited and adjusted by means of set-screws 22, working within standards 23 secured to the frame 1, and reaching over the arm 11. It will be seen that if an electric current is passed through the magnet-coils 16 the armature 18 will be attracted toward it, drawing with it the arm 11, while the pawl 13, engaging a tooth of the ratchet-wheel 7, will turn that wheel to the left in the direction of the arrow $a$, Fig. 1, and will advance the dial 5 one point—that is, will advance the figure disclosed at the front of the dial through the opening in the casing 6, from "0" to "1," &c.—in other words, will add one. While pawl 13 is turning ratchet-wheel 7, as described, the pawl 12 enters the notch of ratchet-wheel 7, which advances beneath it, locks the ratchet-wheel, and prevents the dial being advanced further than one point at a time by its momentum. If the current passing through the magnets 16 is now broken, the rachet 13 and locking-pawl 12 will be carried to their first position, free of the ratchet-wheel, by the action of spring 20. To prevent the ratchet-wheel 7 and disk 5 from being turned and displaced when pawls 12 and 13 are withdrawn, I provide a spring detent-pawl 25, attached to frame 1 and engaging the notches of ratchet-wheel 7. Said detent is so formed as to readily pass to the next notch in either direction when the pawl again turns the ratchet-wheel. If the current be now made to pass through the magnet-coils 17, the same operation as before will occur, only the ratchet-wheel and disk will be turned to the right in the direction of the arrow $b$, Fig. 1, one point, so as to change the figure disclosed from "1" to "0," &c.—that is, one will be subtracted.

The adder and subtracter magnets with their connected pawls, &c., belonging to each ratchet-wheel and dial are exact duplicates of each other. Any number of these dials with operating mechanism described may be placed side by side, according to the capacity of the machine desired. In Fig. 3 a series of four is shown. The one on the right is designated the units-dial; the second, tens-dial; the third, hundreds; the fourth, thousands, &c. Any number of dials desired, with connected parts, may be added to the left of the series shown, and each dial may also be referred to by numbers and designated first, second, third, &c., numbering from right to left of the entire series.

A wire 26 is connected to one pole of an electric battery, represented by 32, Fig. 3. Wire 26 divides into two branches, one of which 27 passes along the upper side of the frame 1 to supply the subtracter-magnets 17, and the other 28 passes to and along the lower side of the frame to supply the adder-magnets 16. Wire 27 extends to and enters the magnet 17 of the units-dial, with branches 29, which leave it in its course and enter the magnets 17 of the tens dial, hundreds, and thousands. Likewise, wire 28 enters units-magnet 16 with branches 30 leading from it to the magnets 16 of tens, hundreds, and thousands. Wire 27 with its branches 29 passes through the respective subtracter-magnets 17, a separate branch through each, and out at the other end of the machine, where they are brought together in a group, which is again designated 27, Fig. 3, since it is the parts of 27 brought together again. So wire 28 with its branches 30 passes through the magnets 16 and out at the other end, where they are formed in a group, which is designated in like manner 28; and in turn these two groups 27 and 28 are brought together in a single group, which for the sake of clearness will be designated 26, for it is the reunion of all the branches into which the single wire 26 leading from the one pole of the battery was divided after they have passed through the several magnets, respectively. A wire 31 leads from the other pole of the battery 32 to the double tablet 66. If contact be now made between wire 31 and any one of the eight wires comprising the group 26, Fig. 3, the circuit from pole to pole of the battery will be closed and the magnet through which that particular branch of group 26 leads will attract its armature and operate its disk, as before described. Such contact with any wire of group 28 will effect addition and with any wire of group 27 will produce subtraction. To furnish convenient means for making such contact between wire 31 and any one of group 26 that may be desired in the process of addition and subtraction, I provide a brush 33, Figs. 3 and 4, having metallic teeth 34 and 35, designated from right to left units, tens, hundreds, and thousands, respectively, one on each side for each disk or dial 5 that is employed. The teeth 34 are the adder-teeth, and the wires of group 28 pass through the handle of the brush and are distributed to the teeth 34, as shown in Fig. 6, the wire which passes through the magnet 16 of the units-dial being connected to the units-tooth 34, that passing through the magnet 16 of the tens-dial being connected to the tens-tooth 34, and so on for hundreds, thousands, and as many dials and teeth as there may be. In like manner the wires of group 27 pass through the handle of the brush 33 and are distributed to connect with the opposite subtracter-teeth 35 of units, tens, hundreds, &c., respectively. Thus each tooth represents the terminus of one of the eight wires of group 26, as shown in Fig. 6. Contact, then, between wire 31 and the tens-tooth 34 would pass a current through the tens-magnet 16 and turn its dial to the left one figure, making the dial read "2" instead of "1," as shown. If the contact instead is made between the tens-tooth 35 and wire 31, the current will pass through the tens-magnet 17 and rotate the disk 5 to the right, subtracting one, so that the dial will read "0" instead of "1," as shown. The wires comprising group 26 must of course be insulated from each other, though they may be formed into one cord, as shown. A tablet 36 is provided, having a central face composed alternately of material that is a non-conductor and of metal. The spaces 37, on which the figures "1" to "9" appear, together with the lowest space, are non-conductors, while the spaces 38 between them are of metal and have metal connections with each other from top to bottom beneath the non-conductor spaces. Wire 31 enters the tablet 36 and is connected with one of the metal spaces 37 from beneath, so that each metal space 38 represents an exposure of wire 31. A raised border 39 on each side of the central face forms a groove through which a tooth of the brush 33 may be drawn. Each time a tooth touches a metal space 38 a circuit is closed, calling into action the magnet connected with that tooth and operating its dial to left or right one point. When the tooth has passed beyond the metal space onto the next non-conductor space, the circuit is broken, the magnet's power ceases, and the arm 11 flies back with its pawl free from the ratchet-wheel. In a moment the tooth of the brush has passed to the next metal space, the circuit is again closed, and the process is repeated. The units-tooth 34 (adder side) being placed on the figure 4 upon the tablet and moved down the same to the bottom the circuit will have been closed and broken four times, moving the units-register dial to the left four points, so as to register "4" instead of "0." If next placed on "5" and brought to the bottom, the dial will register "9," thus adding "5" to the "4." The dial reading "9," if the tooth 35 (subtracter side) is placed on "8," and brought to the bottom of the tablet, the dial will register "1," thus subtracting "8," the figure at which the tooth of the brush starts upon the tablet; but provision must be made where two numbers are added making a sum greater than nine, which require a change in the position of the dial next above to register the result, as where "6" is added to "4." So in subtracting, as where "6" is subtracted from "10." For this purpose—namely, to carry or transfer the tens—I provide an arm 40, connected to the arms 11 near their inner ends, the same being insulated therefrom. A metal post 41 fits loosely within a round opening in the free end of the arm 40, so that said post may play up and down therein freely, but be retained in such opening by means of the head 41ª and the spring 43. Metal studs 42 are placed on each side of the ratchet-wheel 7, one thereof on each side for each ten teeth in said wheel, making four on each side in the drawings, Figs. 1, 2, and 3.

The studs 42 will further be disposed on the ratchet-wheel, as hereinafter described. The arms 40, being secured to arm 11, play back and forth therewith, that attached to the arm 11 on the adder side having its post 41 extending inward near one face of the ratchet-wheel, so as to successively come in contact with the studs 42 on that side, while the other post 41 of the subtracter side is on the other side of said wheel and at proper intervals comes in contact with studs 42 on that side. A helical spring 43, coiled around and secured to the inner end of post 41, holds the post inward toward the studs as far as will be permitted by the head 41ª; but when the post 41 has come in contact with a stud 42 the spring 43, having made the post cushioned or yielding, relieves the force of the blow and allows the post to rest lightly on the stud. A wire 44, connected with the post 41 on the adder side, runs to the magnet 16 on the adder side of the denomination next higher, while a wire 45, connected to the post 41 on the subtracter side, runs to the magnet 17 on the subtracter side of the next higher order. A branch of the wire 31 from the battery, designated 31ª, runs to each metal sleeve 3, within which the axes of the ratchet-wheels turn. As the sleeve 3, the axis 4, and the ratchet-wheel 7 are of metal, this makes the metal studs 42 representatives of wire 31, contact with any one of them being the same as contact with wire 31. Since the several magnets are each connected with branches of the wire 26 from the battery, and the posts 41 are each connected with one such magnet by the wires 44 45, the posts 41 become representatives of wire 26, and contact with them is the same as contact with wire 26. Hence when a post 41 comes in contact with a stud 42 wires 31 and 26 have met, a circuit is closed, and the magnet within that circuit operates. The studs 42 are so disposed that when in the process of addition "0" (zero) appears upon the dial, at the same moment post 41 on the adder side comes in contact with a stud 42, and a circuit being closed through the magnet 16 on the adder side of next higher order, "1" is added to the number displayed on that dial, and when, in the process of subtraction a dial shows "0" (zero), then when that "0" disappears and "9" appears instead, at the same moment post 41 on the subtracter side comes in contact with a stud 42, and a circuit being thereby closed through the magnet 17 on the subtracter side of the next higher order "1" is taken from the figure displayed on its dial.

By reference to Fig. 1, and taking "0" on the dial 5 as the figure displayed, it will be seen that a stud 42 should appear immediately opposite the inner end of post 41, on the adder side because they should have touched at the last action of the adder-magnet and have just separated, while a stud 42 on the other side of the ratchet-wheel 7 should appear slightly in advance of a point opposite the inner end of post 41 on the subtracter side, ready to come in contact with that post at the next action of the subtracter-magnet and its arm 11 with connected parts. The studs 42 on each side of the ratchet-wheel will be placed opposite each tenth tooth of that wheel. The left-hand dial having no order above it may of course omit the parts designed to carry to or take from the higher order. For example, in adding we will suppose that the dials on the right show the figures "310," the fourth dial standing "0," and it is desired to add thereto "693." Place hundreds-tooth 34 on tablet 36 at "6" and draw it down. The three dials will now read "910." Place the tens-tooth 34 on "9" of tablet and draw it down and the tens-dial will register "0" and at the same moment that "0" appears the "9" on the hundreds-dial will change to "0" by operation of the carrying device, and by like operation the "0" on the thousands-dial will become "1," so the dials will show "1000." Next place the units-tooth 34 on "3" of the tablet and draw it down, and the dials will read "1003," the sum of the two numbers. For example, in subtraction suppose the dials read "318," from which subtract "125." Place the hundreds-tooth 35 on "1" of the tablet and draw it down and the dials read "218." Place the tens-tooth 35 on "2" and draw down, and the dials will read "198." Next place the units-tooth 35 on "5" and draw down, and the dials will read "193"—that is, "125" subtracted from "318" leaves "193." Addition or subtraction may be made from right to left or from left to right, but the latter is more convenient. A branch of the wire 31, designated 31$^b$, may be taken into the same bundle as is group 26, insulated from the latter, and carried into the handle of the brush 33, where it connects with a tooth 46, projecting from the handle of the brush on the same side as the subtracter-teeth 35, Figs. 3, 4, and 6. The purpose of the tooth 46 will appear later.

The pencil 47, Fig. 9, may be used for addition and subtraction in connection with the pencil-board 48, Fig. 8. Wire 31 enters the pencil and is connected to its metal point 49. The pencil-board 48 is composed of a series of tablets 50, running from top to bottom of the board, the faces of which are similar to the central face of tablet 36. The spaces upon which the numbers "1" to "9" occur are of non-conducting material, while the blank spaces are of metal and each is connected with a wire or metal rod 51 on its right. The several tablets 50 are connected together upon one back, and any number of tablets are employed that may be desired. The right-hand tablet represents units; the second, tens; the third, hundreds, &c. Each wire or rod 51 extends from top to bottom of the tablets and is connected at its top each to a separate metal block 52. At the head of the board 48 is a switch-plate 53, extending transversely across its top, having slots 54 through which pins 55 attached to the back pass to hold the switch-plate to the board 48 in such manner that it may slide up and down. A cam-lever 56 is pivoted at 56$^a$ to the board 48 above the switch-plate 53 and is provided with a cam-slot 57. A pin 58, secured to the switch-plate 53, extends through the cam-slot 57. Metal straps 59 are secured at one end in the lower edge of the plate 53, and the other end of each holds an angular metal switch-head 60, one on each side of the block 52. The contiguous faces of the blocks 52 and the heads 60 are at the same angle, so that when the arm of the cam-lever 56 is turned to the left, depressing the switch-plate 53, the face of the right-hand switch-head 60 of each pair rests against the face of its block 52; and when the arm of the cam-lever is turned to the right, lifting plate 53, the right-hand head 60 of each pair is lifted free from the block 52 and the left head brought in contact with it.

The groups of wires heretofore designated 27 28 (comprising the group 26) are brought into the switch-plate 53, and adder-group 28 will be distributed, one wire to each strap 59 of the left-hand head 60 of each pair of heads, while the wires of subtracter-group 27 will be distributed to the right-hand head of each pair through their metal straps 59, as shown in Fig. 14. In each case the two wires leading from the units-magnets go to the right-hand pair of heads 60, those from the tens-magnets to the second pair of heads 60, from hundreds to the third, &c. Turning the arm of the cam 56, so as to raise the switch-plate 53 then connects the adder-magnets 16 to the tablets of the pencil-board 48, making it an adder-board; while turning said arm so as to depress the switch plate 53 connects the tablets with the subtracter-magnets 17 and makes the board a subtracter-board. Each metal plate of tablets 50, connected to the rod or wire 51, as described, becomes the terminal points of a branch of wire 26 from the battery through the magnet of its denomination, units, tents, &c. Metal point 49 of pencil 47 is the terminus of wire 31 from the other pole of the battery, and contact between pencil-point 49 and any metal plate of the pencil-board completes the circuit and operates the dial of the denomination represented by the tablet 50 that is touched, thereby effecting addition or subtraction, according to the adjustment of the switching devices described.

Adjusting the switching devices of the board 48 for addition, if we wish to add a column of figures—say "4" "6" "3"—(the dials reading "0,") place the point of the pencil 47 on figure "4" in the right-hand tablet and bring it down to the bottom along the face of the tablet. A circuit is made and broken four times and units-dial registers "4." Next place pencil on "6" in the same tablet and bring down as before. The two right-hand dials now read "10." Repeat the process with the pencil, starting at "3," and the dials read "13." Where a number in tens, hundreds, or thousands denomination is to be added, the pencil is, of course, drawn down the appropriate column or tablet for that denomination. Subtraction is effected in exactly the same manner, the arm of the cam-lever 56 being simply thrown to the side indicated by "—," (minus,) Fig. 8. To keep the pencil-point in the proper column or tablet when being rapidly drawn down, I depress the face of the tablets 50, so that a ridge or raised portion separates them from each other or bounds them on the right and left.

Where the dials read a certain number, as "2864," and it is desired to change or reset them to read "0" each, this can be readily effected by subtracting "2864," the number shown; or if the dials read "0" and it is desired to make them read "2864," for instance, then add that sum in the manner described. Special means may be provided for turning the dials in setting them, as desired, but it is not deemed essential now.

For division a board 61, Fig. 10, is provided. To its left-hand side the tablet 36, heretofore described, is secured, and the subtracter side of the brush 33 is used in connection therewith. Since the process of division is that of subtracting the divisor from the dividend as many times as possible, the number of times being the quotient, upon the lower border of the board 61 I place metallic squares 62 63 64 65, as many of them as there are subtracter-teeth employed on the brush 33. Squares 62 to 65 are so placed that when the thousands-tooth of brush 33 is placed on the tablet and the brush brought completely to the bottom of the board 61 the tooth 46 will sweep over square 65, and with the units-tooth of the brush so used tooth 46 passes over the square 62, with the tens-tooth over the square 63, &c. Branches of wire 28 designated 28ª, are brought into the board 61, and distributed one each to the squares 62 to 65. The wires of group 28ª will run to the adder-magnets 16 toward the left-hand side—for instance, the wire from the square 65 to the adder-magnet of the seventh dial, (counting from right to left,) the wire from the square 64 to that of the sixth dial, from the square 63 to the fifth dial, and the wire from the square 62 to fourth dial. Since squares 62 to 65 each represent termini of wire 26 from the battery, and the tooth 46 a terminus of wire 31, when the tooth 46 touches either of the squares 62 to 65 the circuit is closed through one adder-magnet, and "1" is added upon the dial operated by that magnet. The teeth 35 of the brush will be used to subtract the divisor from the dividend and the tooth 46 upon the squares 62 to 65 will operate to register the number of times the divisor is subtracted, or the quotient. Suppose the dials read "0" and it is desired to divide "9320" by "26." By using the addition-teeth 34 of the brush the dials on the right are made to read "9320." Turn the brush to the subtracter side and subtract "26" from "93" until a remainder less than "26" is left, using first the thousands-tooth 35, placing it on "2" of the tablet and moving the brush completely to the bottom of the board. The "9" will be reduced to "7" on the fourth dial and "1" will be registered by the seventh dial by the tooth 46 passing over the square 65. Next subtract the "6" of the dividend by placing the hundreds-tooth 35 upon "6" and bringing it down to the end of the tablet 36, but this time not bringing it so low as to allow tooth 46 to touch the square 64. The brush will be brought a complete sweep, so as to cause the tooth 46 to operate upon such squares only when the left-hand figure "2" of the divisor is being subtracted. After "26" has thus been subtracted from "93" three times the dividend will read "1520" ("15" being the remainder and less than the divisor) and the seventh dial will show "3" (there being two dials, the fifth and the sixth, showing "0" between the dividend and the quotient). The "3" registered on the seventh dial indicates that "26" has been subtracted from the dividend three hundred times. Next subtract "26" from "152" by first taking "2" from "15" by placing the hundreds-tooth 35 on the tablet at "2" and brushing a complete sweep, whereby "1" is now registered on the sixth dial. Then subtract the "6" from "2" by tens-tooth with shortened sweep, as before. When "26" has thus been subtracted from "152" five times, the quotient on the sixth and seventh dials reads "35" (representing "350") and the dividend stands "220," the "22" being the remainder of the "152." Now take "26" from "220," using first the tens-tooth 35 to subtract the "2" and the units-tooth to substract the "6." When this has been done eight times, the quotient on the fifth, the sixth, and the seventh dials reads "358," and the remainder of the dividend is "12," two dials still reading "0" between the quotient and the remainder. It is found thus that "9320" divided by "26" gives a quotient of "358" with "12" as a remainder. The left-hand number of the divisor may often be subtracted several times before subtracting the other numbers of the divisor, they being afterward in succession subtracted the same number of times. For instance, in the example just given, the "2" of the divisor might have been subtracted from the "9" of the dividend three times in succession, leaving the dividend "3320." Then subtract the "6" of the divisor from the "33" of the dividend the same number of times in succession, (three,) leaving the dividend "1520." Next subtract the "2" of the divisor from the "15" five times in succession. Then subtract the "6" of the divisor from the left-hand figure of the dividend five times, and, lastly, subtract the "2" of the divisor eight times and the "6" of the divisor the same number of times successively, as before, making the "complete sweep" of brush 33, so as to register a quotient only when subtracting the "2," as in illustration first given.

By attaching the metallic squares 62 to 65 to the foot of the pencil-board 48 and throwing the switch to arrange for subtracting, that board may be used for division likewise. In such event the square 62 will be placed at the foot of the right-hand or unit tablet 50, 63 at that of the second tablet, 64 at the third, 65 at the fourth, &c., a square being provided for each tablet used and the wire connections to the magnets from the squares being the same as before. Taking the same example, "9320" on the four dials at the right to be divided by "26". Place point 49 of the pencil on "2" of the thousands-tablet and draw to the bottom a complete sweep, crossing square 65. The latter contact will then register the quotient on the seventh dial, as before, and contact with the tablet will effect the subtraction on the fourth dial. In subtracting the "6" of the divisor, the pencil stops before reaching the metallic square, &c.

It remains to describe the means for multiplication. A double tablet 66, Figs. 11 and 15, has a raised central portion 67 separating the two circuit maker and breaker (or tablet) faces 68 69. The spaces on the two faces 68 69, designated 70, are metallic plates, of which there are nine on 68 and eight on 69. The spaces 71 are non-conductor surfaces. The double tablet is provided with a handle 72, also with a metallic foot 73, secured to the tablet by a shank 78. A group of seventeen wires 74, insulated from each other, enters the double tablet, and the wires are distributed one to each of the plates 70, the plates 70 being insulated from one another. These wires 74 are divided into two groups 75 76, the group 76 of nine wires comprising those connected with plates 70 on the tablet-face 68, and group 75 of eight wires comprising those connected to the plates on the face 69. A multiplier-board 77 has thereon eighty-one squares, nine each way. These squares may be considered in rows or columns; first in columns running up and down the board, and second in columns running across from side to side of the board. The columns running up and down are multiplicand rows and are numbered at the top from right to left "1" to "9." The columns running from side to side of the multiplier-board 77 are numbered at the left-hand side from bottom to top "1" to "9," and are the multiplier rows. The particular position on the board of these numbers designating the rows is not essential.

For convenience group of wires 76 from side 68 is taken to the right-hand side of the multiplier-board 77 for distribution, and the group 75 from side 69 to the left-hand side. These wires are exposed upon the eighty-one squares in varying numbers. The wires of the group 76 are intended to register the units-number of the product in multiplying and those of the group 75 the tens of such product. For instance, four multiplied by eight is thirty-two. The wires of 75 will register the "3" and those of 76 the "2." The highest number of units to register is of course nine; so nine plates 70 on the side 68 are required and nine wires 76.

The highest number in tens to register is eight, (in nine times nine.) Hence eight plates 70 on the 69 side and eight wires in the 75 group are required. The wires of group 76 are distributed onto the squares at the lower side of each, and those of group 75 at the top side of the squares, for convenience of explanation. The figures at the left hand of the board 77 represent the multiplier and those at the top the multiplicand. If we select "4" as a multiplier and run to the right on that column to the space below "3," which we take as a multiplicand, since four times three are twelve, we will find two wires at bottom of the square to register the "2" of the product and one wire at the top of the square to register the "1." Taking "8" as a multiplier and "7" as a multiplicand, making "56," the square has six wires below and five above, while the square for two times two has "4" below and "0" above, and the square for two multiplied by nine has eight wires of group 76 and one wire of group 75.

A wire in passing across the board will appear on a square, disappear, and reappear again, as required. So far no connection with the battery or the magnets and dials has been described. The wire 31 is connected with foot 73, thereby making connection with one pole of the battery. Foot 73 is of such size as to fit upon any one of the squares of the board 77, a small raised border separating the squares. For example, take "4" as the multiplier and "7" as multiplicand. Take tablet 66 in the left hand and place its metal foot 73 on the square where the columns "4" of multiplicand and "7" of multiplier meet. Foot 73 is now in contact with two wires leading to two points 70 of side 69 of the tablet and is in contact with eight wires leading to eight points 70 on the other side of the tablet. Since foot 73 represents wire 31 by contact with the 2 and 8 wires on the board, those wires and their terminal points 70 on the tablet become wire 31. We use now the brush 33, (described before, and connected to the magnets,) adder side. Taking the brush in the right hand, placing units-tooth 34 at the top of face 68 of the tablet, while tens-tooth 34 will be on face 69, we sweep the brush to the bottom. Units-tooth 34 has come in contact with eight live points 70, (one being dead,) registering "8" on units-dial, while at the same time the tens-tooth 34 has come in contact with two live points 70, (the other six being dead), registering "2" on tens-dial and the two dials showing the product "28." One point and six points are respectively "dead" in the case just stated, because one wire of group 76 and six wires of group 75 do not appear upon the square upon which the foot 73 is placed. Those wires and the points 70 with which they are connected are therefore not in electric connection with the battery and are called "dead." It will be observed that the spaces 70 on the respective sides of the tablet 66 are not opposite, but are alternate and are so arranged that the tooth 34 moving over side 68 has passed across the top space 70 and onto the non-conductor space 71 before the tooth passing over the other side 69 has reached the first space 70 on that side, and so on throughout the length of the tablet, only one tooth being in contact with a space 70 at a time. This allows opportunity for the free operation of the carrying devices before described.

For an example in multiplying, we will now take "534" to be multiplied by "4." The dials read "0." Selecting the multiplier column "4," place foot 73 beneath "5" thereon. Since the "5" of multiplicand is hundreds, place hundreds-tooth 34 on face 68, thousands-tooth 34 being on the face 69, and brush down. The dials read now, respectively, "2 0 0 0." Next slip the foot over beneath "3" and place tens-tooth on face 68, hundreds-tooth coming on face 69, and brush down. The dials now read, respectively, "2 1 2 0." Lastly, place the foot beneath "4," use units-tooth of the brush this time on face 68, tens-tooth coming on face 69, and brush down, as before. The dials now register the full product "2136." If it were required to multiply the same number "534" by "42," first multiply through by "4," as before, with this difference: Use the adder-tooth of one higher denomination each time, the effect being that you multiply first by "40" as you desire to do. Then multiply through by "2," as first explained.

In lieu of the foot 73 a key 79, Figs. 16 and 17, may be provided for each square on the multiplier-board 77, eighty-one in all. The key is provided with a central shank 80, of metal, and the under surface 79ª of the key is of metal. The shank 80 fits in a socket 81 in the center of the squares on the board 77, while a helical spring 82 upon the shank operates between the face of the square and the under side of the key 79, so as to raise the key free from the wires upon the square. Each key may have its appropriate multiplier number on its top surface, while the figure at the head of the column on the board will show the multiplicand, as before. Wire 31 is now connected to the shank 80 of each key. It will be readily seen that if key 79 be pressed down upon the wires distributed to any square that the effect is the same as placing foot 73 upon that square. Foot 73 may then be dispensed with, also the handle 72, and the tablet 66 secured permanently to a table, a board, or in any way desired. The left hand will then be free to operate the keys 79, while the right operates the brush upon the tablet 66, as before.

It will be readily understood that the "non-conductor" surfaces or spaces upon the several tablets described need not strictly be composed of rubber or non-conductor material, it being sufficient if they are insulated from the "conductor" spaces or surfaces of the tablet.

The multiplier, divider, and pencil-boards may be allowed to lie on the desk or table when used, while the case holding the dials may stand at any convenient place or be hung upon the wall or in other manner, near or at a distance.

The several boards, tablets, pencil, and brush may be connected and disconnected from the dial-case as desired for use, and a single set of the dials with case and their parts may be provided and located at a convenient place in an office, with separate boards, brushes, &c., connected up so that several persons may use the same alternately.

What I claim as new, and desire to secure by Letters Patent, is—

1. In an electric calculator, the combination of a series of dials each representing a different denomination and having numbers upon their faces corresponding to the places in each denomination, electro-magnets for each dial provided with armatures each adapted by the action of the magnet to move an arm with a pawl thereon, ratchet wheels adapted to be engaged by such pawls and thereby rotated to the right or left together with its connected dial each time an electric current passes through the magnet, means to swing the arms and pawls back when the electric current is broken, studs projecting from the opposite faces of the ratchet wheels, a post carried by each of said arms and adapted to swing therewith, said studs being so disposed and said post so adapted as to come in contact with one of said studs only when a number is to be added to or taken from the next higher denomination, means for connecting said studs with one pole of an electric battery, and means for connecting said posts with the other pole of the battery, in such manner that when a post and stud are in contact with each other, an electric circuit is closed through the corresponding magnet of the next higher order, and other means for making and breaking an electric current through the respective magnets of each denomination substantially as described.

2. In an electric calculator the combination of a series of dials each representing a different denomination and having the numbers of their respective denominations upon their faces arranged in proper order, one or more full series on each dial, a ratchet wheel for each dial designed to rotate both to the right and to the left and to carry the dial in each direction, two pivoted arms, one at each side of the ratchet wheel, and each adapted to rotate the wheel toward its side by means of a pawl engaging in the teeth of the wheel, a pawl upon each of said arms adapted to swing therewith and to engage and lock the ratchet wheel when it has moved one point by the same action of the arm, an armature secured to each of said arms, an electro-magnet for each armature adapted to attract the same and thereby to operate the arm, locking pawl, operating pawl, ratchet wheel, and dial by the closing of an electric circuit, means to swing the arm, pawl and locking pawl back when the circuit is broken, ready for their next action, a cushioned post carried by each of said arms and one thereof playing near each face of the ratchet wheel, studs projecting from the faces of said wheel and so disposed that one thereof will be struck by the cushioned post on that side when a number is to be added to or taken from the next higher denomination, means for connecting said studs with one pole of an electric battery, means for connecting said posts with the other pole of the battery through the magnet operating on the same side of the ratchet wheel of the next higher order, and other means for making and breaking an electric current, substantially as set forth.

3. In an electric calculator for registering the results of mathematical calculation upon a series of registering faces representing denominations successively of a higher order, means for making and breaking an electric current to advance the numbers on said faces or to reduce them as desired, consisting of a tablet the face of which has a series of conductor surfaces equal to the numbers in each denomination, connected with one pole of a battery and intervened by non conductor surfaces; and a brush provided with two sets of teeth, one in each set for each of said registering faces, each tooth of one set connected to the other pole of the battery through a separate magnet, each adapted to operate one registering face to advance the numbers thereon, and each tooth of the other set connected in like manner to the same pole through magnets adapted to reduce the numbers on their registering faces respectively, substantially as set forth.

4. In an electric calculator, the combination of a series of registering faces each representing a different denomination and having numbers thereon corresponding to the places in each denomination, a series of electro-magnets for the several registering faces respectively, means whereby the action of a magnet will add to or take from a number displayed by its face, tens-carrying devices whereby the action of the mechanism adapted to advance or reduce the numbers on any such face, will automatically call into action the magnet and mechanism respectively adapted to add to or take from the numbers on the face of the next higher order when required, and means for opening and closing an electric current, consisting of a tablet the face of which has a series of conductor surfaces equal to the numbers in each denomination, connected with one pole of a battery and intervened with non conductor surfaces, and a brush having a tooth corresponding to each registering face and connected to the other pole of the battery through the magnet of its corresponding dial, substantially as herein set forth.

5. In an electric calculator, the combination of a series of registering faces each representing a different denomination and having numbers thereon corresponding to the places in each denomination, a series of electro-magnets for each registering face, one set adapted to operate appliances to advance the numbers displayed on their respective registering faces and the other set adapted to reduce the same, and means for closing and opening an electric current consisting of a board or tablet the face of which has a series of conductor surfaces equal to the numbers in each denomination, intervened by non conductor surfaces, a metallic point adapted to be moved over the surfaces of said tablet, means for connecting said conductor surfaces with one pole of a battery and said point with the other pole, one of said electric connections passing through magnets adapted to add to or subtract from the number displayed on the dial, and means for varying said connection so as to pass through either the "adder" or "subtracter" magnets as desired, substantially as shown and described.

6. In an electric calculating machine the combination of a series of registering faces having numbers thereon corresponding to the places in each denomination of the series, a series of electro-magnets corresponding to said registering faces, each adapted to operate appliances to reduce the number displayed on their respective registering faces, a brush having a tooth for each denomination present in the sum to be used as a dividend, means for electric connection of each tooth to one pole of a battery through the said magnet of the corresponding denomination, a quotient registering tooth upon said brush and connected to one pole of a battery, a divider board consisting of a tablet the face of which has a series of conductor surfaces equal to the numbers in each denomination, intervened by non-conductor surfaces, said conductor surfaces being connected to the opposite pole of the battery to that from which connection through said magnets run; and of a second series of conductor surfaces conected to the opposite pole of the battery to which said quotient registering tooth is connected, through a series of magnets adapted to operate mechanism to add to the numbers on their respective dials, and said last series of conductor surfaces being so disposed upon said board that said quotient registering tooth will pass over them one at a time successively to register the quotient when the brush is given a full sweep in subtracting the divisor from the dividend, and tens-carrying devices adapted to reduce the number displayed on a higher order by the action of the parts which operate the registering face of the lower order, substantially as shown and described.

7. In an electric calculator the combination of a series of registering faces, a series of electro-magnets adapted to operate said registering faces, a brush having a series of teeth representing respectively the denominations of said registering faces, and having a quotient registering tooth, a divider board having thereon a tablet with a series of conductor surfaces intervened by non conductor surfaces, and a second series of conductor surfaces so disposed that when one of the teeth first named is passed over said tablet and board a full sweep, the said quotient registering tooth will pass over one of said second series of conductor surfaces, and means for connecting said conductor surfaces and teeth with said magnets and the poles of a battery, substantially as described.

8. In an electric calculator for effecting division and other calculations, the combination of a series of registering faces having numbers thereon corresponding to the places in each denomination of the series, a series of electro-magnets corresponding to said registering faces each adapted to operate appliances to reduce the number displayed on their respective registering faces, means for registering the remainder when the divisor is being subtracted from the dividend, consisting of a board on the face of which is a series of conductor surfaces equal to the number in each denomination, intervened by non-conductor surfaces, a metallic point adapted to be moved over the said conductor and non conductor surfaces, and means for connecting said conductor surfaces with one pole of a battery and said point with the other pole, one of said electric connections passing through said magnets, and means for registering the quotient consisting of a second series of conductor surfaces connected to one pole of a battery through a series of magnets adapted to operate mechanism to add to the numbers on their respective dials, said last series of conductor surfaces being so disposed upon said board that a point connected with the other pole of the battery will pass over them successively one at a time, when the metallic point which is moved over said first series of conductor surfaces is given a full sweep in subtracting the divisor from the dividend; and tens-carrying devices adapted to reduce the number displayed on a higher order when the number displayed on a lower order calls for such change, substantially as described.

9. In an electric calculator, having a series of registering faces representing denominations, a divider board on the face of which is a series of conductor surfaces connected with a pole of a battery and intervened by non conductor spaces and a second series of conductor surfaces connected with a pole of a battery; in combination with means for making and breaking the circuit with said first named series of conductor surfaces to register the remainder on said registering faces in the process of division, and by the same movement of said means, to close an electric circuit upon said second series to register the quotient, means for operating said registering faces by making and breaking said circuits, and tens-carrying devices, substantially as set forth.

10. In an electric calculator the combination of a series of registering faces representing different denominations and adapted to display successively the numbers of an arithmetical order, a series of electro-magnets with intervening mechanism adapted to operate said registering faces, a brush provided with a series of teeth representing the several denominations of said registering faces, and having connection with the pole of a battery through the magnets of the registering faces of their respective denominations a double tablet having two faces composed each of a series of conductor and non conductor surfaces arranged alternately, a multiplier board having spaces or squares thereon, each representing a multiplicand and a multiplier, a number of conductor points exposed on said squares equal to the sum of the numbers which express the product of the multiplicand and multiplier represented by such square, connection between the conductor points of said squares and the conductor surfaces of said tablet, and means for connecting the conductor points on said squares with the opposite pole of said battery, substantially as set forth.

11. In an electric calculator for effecting multiplication and other arithmetical operations, the combination of a multiplier board having spaces or squares thereon each representing a multiplicand and a multiplier, and a number of conductor points exposed on said squares equal to the sum of the numbers which express the product of the multiplicand and multiplier represented by such square, a series of conductor surfaces separated by non-conductor surfaces, and connected each with one of said conductor points on said squares, a brush having a series of teeth representing successive arithmetical denominations, adapted and said conductor surfaces so disposed, that a tooth of lower order may pass over the series of conductor surfaces which is connected to the said points on the square which represent the lower denomination of said product, and the tooth of the next higher order may pass over the series which is connected to the points on the square which represent the higher denomination of said product, means for connecting the points on said squares with one pole of a battery, means for connecting said teeth with the opposite pole of a battery and means located on said circuit, adapted to register said product and the sum of successive products, substantially as shown and described.

12. In an electric calculator the combination of a series of registering faces representing different denominations and adapted to display successively the numbers of an arithmetical order, a series of electro-magnets with intervening mechanism adapted to operate said registering faces, a brush provided with a series of teeth representing the several denominations of said registering faces and having connection with the pole of a battery through the magnets of the registering faces of their respective denominations, a double tablet having two opposite faces composed each of a series of conductor and non-conductor surfaces arranged alternately on the same face and alternately to each other on the opposite faces, a multiplier board having spaces or squares thereon each representing a multiplicand and a multiplier, a number of conductor points exposed on said squares equal to the sum of the numbers which express the product of the multiplicand and the multiplier represented by such square, connection between said points on said squares which represent the lower denomination of said product, and the conductor surfaces of one face of said tablet, and connection between said points which represent the higher denomination of said product and said surfaces of the other face of said tablet, means for connecting the conductor points on said square with the opposite pole of said battery and means to increase the number displayed on a higher order of registering face when the number produced on the lower order requires it, substantially as described.

13. In an electric calculator the combination of a series of registering faces representing different denominations and adapted to display successively the numbers of an arithmetical order, a series of electro-magnets with intervening mechanism adapted to operate said registering faces, a brush provided with a series of teeth representing the several denominations of said registering faces and having connection with the pole of a battery through the magnets of the registering faces of their respective denominations, a double tablet having two opposite faces composed each of a series of conductor and non-conductor surfaces arranged alternately on the same face and alternately to each other on the opposite faces, a multiplier board having spaces or squares thereon each representing a multiplicand and a multiplier, a number of conductor points exposed on said squares equal to the sum of the numbers which express the product of the multiplicand and the multiplier represented by such square, connection between said points on said squares which represent the lower denomination of said product, and the conductor surfaces of one face of said tablet, and connection between said points which represent the higher denomination of said product and said surfaces of the other face of said tablet, a metallic foot secured to said tablet, connected with the opposite pole of said battery and adapted to be placed upon said squares, substantially as herein set forth.

14. In an electric calculator the combination of a series of registering faces representing different denominations and adapted to display successively the numbers of an arithmetical order, a series of electro-magnets with intervening mechanism adapted to operate said registering faces, a brush provided with a series of teeth representing the several denominations of said registering faces, and having connection with the pole of a battery through the magnets of the registering faces of their respective denominations, a double tablet having two faces composed each of a series of conductor and non-conductor surfaces arranged alternately, a multiplier board having eighty one spaces or squares arranged in rows nine in a row each way, and each representing a multiplicand and a multiplier, a number of conductor points exposed on said squares equal to the sum of the numbers which express the product of the multiplicand and multiplier represented by such square, connection between the conductor points of said squares and the conductor surfaces of said tablet, and means for connecting the conductor points on said squares with the opposite pole of said battery, substantially as set forth.

WM. C. PORTER.

Witnesses:
ALBERT ZIMMERMANN,
HENRY BOETTCHERS.